Nov. 25, 1952     A. C. MENGEL     2,619,408
METHOD OF TESTING LUBRICATING OIL
Filed April 19, 1950
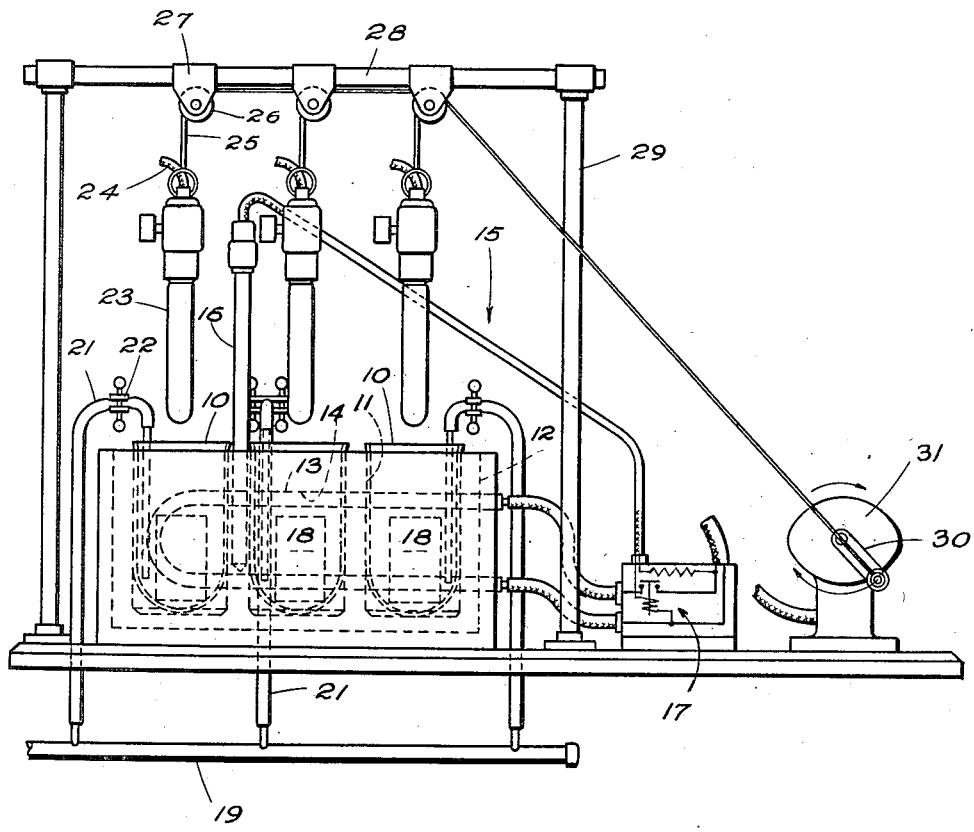
INVENTOR
ARTHUR C. MENGEL
BY Maurice W. Grady
ATTORNEY Patented Nov. 25, 1952

2,619,408

UNITED STATES PATENT OFFICE 2,619,408

METHOD OF TESTING LUBRICATING OIL

Arthur C. Mengel, Ballston Lake, N. Y.

Application April 19, 1950, Serial No. 156,918

2 Claims. (Cl. 23—230)

This invention relates to a method of testing lubricating oils to determine their resistance to sludging, particularly lubricating oils of the class used in crankcases of internal combustion engines.

Sludge tests are known in which conditions simulating service conditions in a lubricating oil system are created so that a supply of oil is heated, oxidized, and exposed to metallic catalysts to cause sludge to form therein in measurable quantities. Generally speaking, such tests determine the sludging characteristics that may be expected in service when the oil from which the supply is taken is subjected to the high temperatures and operating conditions of the oiling system which it will supply. But since lubricating oils distilled from crudes obtained from different sources, say Pennsylvania or Mid-Continent, vary considerably in molecular structure and even differ from each other when coming from a same source because of refining methods and different blending, and since the oiling systems of different kinds of internal combustion engines are subjected to widely variant sludging factors, it has been thought impractical to devise a uniform or standard system of testing all crudes to be used for all classes of internal combustion engines. Further obstacles to a standard system for all lubricating oils result from the use of different oxidation inhibitors and from the use of compounds to impart additional load-carrying properties to the oil film.

The principal object of the invention herein is accordingly to provide a method of testing a sample of heavy duty additive lubricating oil taken from a supply having known viscosity characteristics conforming to S. A. E. standards for the purpose of determining its sludging characteristics when used in a diesel engine of the class which functions as a prime mover in a Diesel-electric locomotive. Another object is to provide apparatus adapted to simulate the service conditions to which lubricating oil of such a diesel engine is subjected and to test in such apparatus a sample of oil taken from a supply having known viscosity characteristics conforming to S. A. E. standards in order to determine its tendency to sludge. In accordance with the invention, a convenient laboratory test for a supply of lubricating oil may be conducted in a manner to provide all the conditions encountered by the oil in actual service; and the conditions may be adjusted to correlate the test with various service performances. Such conditions include temperature, time, catalytic surfaces, and rate of air exposure.

The drawing discloses apparatus suitable for carrying out my novel testing method. In the test of the invention, a charge of 300 c. c. of lubricating oil taken from a supply to be tested is placed in a container, such as a beaker 10, which is arranged in a receiving well 11 formed in a cast aluminum block receptacle 12. A plurality of such beakers, three in the illustrative embodiment, is usually provided so that several samples may be tested at the same time. The charge is heated to 300° F. and maintained at that temperature throughout the test. Such heating is produced by electric means in a constant temperature holder 12 which is preferably a block of heat-conducting solid metal such as aluminum. An electric tubular or strip heater 13 extends through a U-shaped bore or slot 14 formed in the aluminum block, and is disposed in circuit with a thermostatic control, generally indicated as 15, to control the voltage supplied to it. Thermostat 15 includes a mercury regulator 16 arranged in the block used in the test, a conventional relay 17 being provided to control the circuit to heater 13.

A catalyst is also inserted into the test sample in the form of a 5 square inch plate 18 of admiralty metal having a smooth polished surface. Admiralty metal is provided in the illustrative embodiment since the lubricating oil cooler in the cooling system of the diesel engine of one well known type is composed of such metal. If other metallic elements are utilized in the diesel engine, which will come in contact with the lubricating oil, as for example silver cadmium wrist pins, cast iron or aluminum pistons, or Babbitt bearings, plates of such metals, having areas in predetermined ratios to the areas of the oil contacting metallic elements, are immersed in the test sample. It is well known in the art that these metallic elements are active catalysts for oil oxidation.

Air is bubbled through the sample at a rate of about 200 c. c. per minute after the oil has attained a temperature of 300° F. Such air is supplied through manifold 19 leading from a source of supply (not shown) to feed tube 21, the outer end of which is disposed near the bottom of the beaker. A clamp adjustor 22 may vary the air supply as desired. The rate of air feed may be varied within wide limits in accordance with the needs of testing for any special conditions as desired. Thus far described, the test of the invention subjects the oil to the action of heat, catalytic surfaces, and air exposure. Each of these factors may be varied to meet the changing requirements of other diesel engines.

A 25 watt 110 volt electric light bulb 23, supplied by conductor 24, is immersed and withdrawn from the test sample once a minute. The intermittent immersion may be performed by suspending bulb 23 over beaker 10 by means of a wire 25 running over a pulley 26 whose carrier 27 is clamped to a rod 28 supported on stanchions 29. Wire 25 is secured to arm 30 which is rotated by motor 31, the latter rotating at one R. P. M. The bulb will be immersed in the oil sample for approximately 25 seconds out of each minute. Any equivalent heat source that is catalytically inert may be used although an electric light bulb is preferred because it is available, cheap, and fulfills the purpose.

As the testing proceeds, the oil sample will become black, probably about the 320th hour. About a day or so thereafter a brown or black deposit will begin to form on the bulb. This deposit is sludge such as will form in the oil when subjected to service conditions. The hour of the appearance of the sludge is noted and the test is thus completed.

It has been found that oils which do not form a sludge before 360 hours of continuous test are satisfactory for use in a diesel engine of the type used to drive the electrical equipment of a diesel-electric locomotive.

While there has been hereinbefore described an approved embodiment of this invention, it will be understood that many and various changes and modifications in form, arrangement of parts and details of construction may be made thereto without departing from the spirit of the invention, and that all such changes and modifications as fall within the scope of the appended claims are contemplated as a part of this invention.

What I claim is:

1. A method of testing lubricating oil to determine the rate at which sludge will form therein when subjected to service conditions of a diesel engine of the class used as a prime mover in a diesel-electric locomotive consisting of providing a sample of such oil, heating the sample to a predetermined temperature, maintaining the sample at such temperature, supplying air to the sample so that it will bubble therethrough at a constant rate thereby subjecing the sample to oxidation, positioning in the sample a metallic catalyst the area of which bears a predetermined ratio to the area of the same metal as it may form part of and be exposed to the oil in the lubricating oil system of the diesel engine for which the lubricating oil is to be supplied, intermittently immersing a heated member of catalytically inert material adapted to supply a constant amount of heat into the sample until a sludge forms thereon in response to the action of the heat, air, and catalyst upon the oil sample the time necessary for the formation of sludge being indicative of the relative sludging properties of oil samples treated under the same conditions.

2. A method of testing lubricating oil to determine the rate at which sludge will form therein when subjected to service conditions of a diesel engine of the class used as a prime mover in a diesel-electric locomotive consisting of providing a metallic block adapted for heating to a predetermined constant temperature, disposing in such block a container having a sample of oil therein, heating the block and hence the sample of oil to a predetermined constant temperature, maintaining such heat at a constant level, supplying air to the sample so that it will bubble therethrough at a constant rate thereby subjecting the sample to oxidation, positioning in the sample a metallic catalyst, the area of which bears a predetermined ratio to the area of the same metal as it may form part of and be exposed to the oil in the oil lubricating system of the diesel engine for which the lubricating oil is to be supplied, intermittently immersing a lighted electric lamp into the sample until a sludge forms thereon in response to the action of the heat, air, and catalyst upon the oil sample the time necessary for the formation of sludge being indicative of the relative sludging properties of oil samples treated under the same conditions.

ARTHUR C. MENGEL.

REFERENCES CITED

The following references are of record in the file of this patent:

UNITED STATES PATENTS

| Number | Name | Date |
|---|---|---|
| 1,030,422 | Muench | June 25, 1912 |
| 1,515,914 | Ungar | Nov. 18, 1924 |
| 2,317,950 | Burk et al. | Apr. 27, 1943 |